United States Patent [19]
Hayashi

[11] Patent Number: 5,907,540
[45] Date of Patent: May 25, 1999

[54] RADIO DATA COMMUNICATION APPARATUS HAVING A RELAY FUNCTION AND RADIO DATA COMMUNICATION METHOD AND SYSTEM USING THE SAME

[75] Inventor: Kenji Hayashi, Hadano, Japan

[73] Assignee: Hitachi, Ltd., Tokyo, Japan

[21] Appl. No.: 08/530,709

[22] Filed: Sep. 19, 1995

[30] Foreign Application Priority Data

Sep. 21, 1994 [JP] Japan ................................. 6-226246

[51] Int. Cl.$^6$ ............................... H04B 7/15; H04J 3/26
[52] U.S. Cl. ...................... 370/315; 370/349; 370/351; 370/393; 455/11.1
[58] Field of Search ................................. 370/315, 328, 370/338, 349, 351, 312, 393, 492, 501; 455/7, 11.1, 13.1

[56] References Cited

U.S. PATENT DOCUMENTS

| | | | |
|---|---|---|---|
| 4,081,612 | 3/1978 | Hafner | 370/393 |
| 4,999,833 | 3/1991 | Lee | 370/312 |
| 5,007,052 | 4/1991 | Flammer | 370/389 |
| 5,115,433 | 5/1992 | Baran et al. | 370/400 |
| 5,200,955 | 4/1993 | McFarlane et al. | 370/315 |
| 5,265,150 | 11/1993 | Helmkamp et al. | 379/58 |
| 5,287,356 | 2/1994 | Parkhideh | 370/445 |
| 5,570,354 | 10/1996 | Simon | 370/315 |

FOREIGN PATENT DOCUMENTS 3-250820   11/1991   Japan .

OTHER PUBLICATIONS

"Nikkel Communications", Mar. 7, 1994, vol. 3, No. 7, pp. 100–105.
"An Ethernet Address Resolution Protocol —or—Converting Network Protocol Addresses to 48. Bit Ethernet Address for Transmission on Ethernet Hardware", David C. Plummer, Nov. 1982, RFC826.TXT, pp. 1–9.
"Information Technology—Telecommunications and Information Exchange Between Systems—Local Area Networks—Media Access Control (MAC) Bidges", Draft Amendment ISO/IEC DIS 10038/DAM 2, 1992, pp. 1–42.

*Primary Examiner*—Hassan Kizou
*Attorney, Agent, or Firm*—Fay, Sharpe, Beall, Fagan, Minnich & McKee

[57] ABSTRACT

In a radio data communication network where a plurality of radio data communication apparatuses mutually communicate information through frames carried by radio waves, a communication method using radio data communication apparatuses having a relay function is provided. When two radio data communication apparatuses cannot directly communicate with each other due to the limit of the radio wave range, another radio data communication apparatus serves as a relay station to relay frames between the two apparatuses, thus extending a communicable range.

24 Claims, 14 Drawing Sheets

FIG. 8

| DESTINATION ADDRESS | REMITTENT ADDRESS | IDENTIFICATION FLAG | SEARCH ADDRESS | IDENTIFICATION INFORMATION | RELAY STATION ADDRESS FIELD (RSAF) |
|---|---|---|---|---|---|
| β (BROADCAST) | Y | REQ | X | N | a ... b c |
| 10a | 10b | 10c | 10d | 10e | 10f |

| DESTINATION ADDRESS | REMITTENT ADDRESS | IDENTIFICATION FLAG | SEARCH ADDRESS | IDENTIFICATION INFORMATION | RELAY STATION ADDRESS FIELD (RSAF) |
|---|---|---|---|---|---|
| a, b OR c | Y | RSP | X | N | a ... b c |
| 10a | 10b | 10c | 10d | 10e | 10f |

↙ 11

RADIO DATA COMMUNICATION APPARATUS HAVING A RELAY FUNCTION AND RADIO DATA COMMUNICATION METHOD AND SYSTEM USING THE SAME

BACKGROUND OF THE INVENTION

The present invention relates to a radio data communication apparatus, and a radio data communication method and system using the same, and more particularly, to radio data communication techniques which enable two radio data communication apparatuses, located at a distance too long to enable direct communication between them, to communicate with each other through at least one radio data communication apparatus which performs a relay function and exists between the two radio data communication apparatuses.

Conventionally, as disclosed in JP-A-3-250820 entitled "Local Area Network and Communication Network", radio communication ranges have been extended by additionally installed wired LAN (Local Area Network) for connecting base stations each other. However, the installation of wired LAN implies a problem that it needs additional expense and the system design requires extra labor and time. Generally, the installation of wired LAN requires a system design, construction, connectivity tests, and so on. In addition, once the network system is configured, it cannot be flexibly changed. Further, the cabling may often spoil good appearances. Thus, the construction of a wired LAN is not sometimes desirable in hired stores, offices with walls made of expensive materials (marble or the like), windows for serving customers, which must maintain good appearances, sales floors, and so on.

An example of the prior art for direct communications between radio terminals without intervention of a base station has been proposed in Mar. 7, 1994 issue of a magazine called "Nikkei Communications". In the scheme proposed in this example, however, communications available to each radio terminal is limited to a range in which radio waves sent from a transmitter directly reach a destination stations.

If radio waves from a transmitter do not directly reach a destination stations, a relay station is generally utilized for communications therebetween. The relay station may be searched through the following two techniques.

A first technique is ARP (Address Resolution Protocol) which is used for address resolution for a protocol called TCP/IP. This technique, however, is intended to search for a physical address of a destination station but not for an address sequence of relay stations. Neither one performs chain extension of broadcast in consideration of a radio wave range (zone) which is particular in the radio data communication network. For reference, ARP is described in RFC826 "An Ethernet Address Resolution Protocol" published from Internet Society.

A second technique is source routing in IEEE802.5 in which, however, a relaying system is limited to a particular bridge. Further, every station does not perform a chain extension of broadcasts in consideration of a radio wave reachable range (zone) which is particular in the radio data communication network. In the source routing, an alternative route must be previously prepared for a failure of the bridge. Otherwise, a bypass route cannot be ensured for the communications in case a failure occurs.

In the prior art as described above, an extension of radio communication area requires the installation of wired LAN which is sometimes severely restricted in terms of location, time and cost.

Also, as the route of communication is fixed, the prior art for the communication system has other problems that its resistance to failures for the cable and extra communication devices is lower and controlling distribution of traffic loads is difficult.

SUMMARY OF THE INVENTION

It is an object of the present invention to provide radio data communication techniques which are capable of conveniently extending a radio communicable area in a short working time without relying on a restricted wired LAN as a relay station.

It is another object of the present invention to provide radio data communication techniques which achieve a high resistance to failure and easy distribution of loads.

In the present invention, each radio data communication apparatus is provided with a relay function. Thus, when two radio data communication apparatuses, located too far that radio waves do not directly reach from one to the other, are to communicate with each other, the radio data communications are relayed with intervention of one or more other radio data communication apparatuses, to which each of the two radio data communication apparatuses can access directly or indirectly with other relay stations. In this way, a communicable range is extended.

Also, if a radio data communication apparatus (hereinafter called the "communication apparatus") functioning as a relay is searched without success, a wide area radio communication network, for example, a public radio communication network such as the digital cellular, PHS (Personal Handy Phone System, Japanese specific digital rellation system), or the like, is used as an alternative communication route for accomplishing the communications with a destination communication apparatus. In this case, however, a device and software for connecting the wide area radio communication network with the radio LAN is additionally required.

Thus, the above-mentioned objects are achieved by merging radio wave ranges (this range is called the "zone") of other communication apparatuses.

In a first embodiment, when a sending end communication apparatus is to communicate with a destination communication apparatus, the sending end communication apparatus first makes an attempt to see whether a direct communication is possible. A data frame used in this communication may be one according to the present invention, later described, or another one. In either case, a data frame for direct communications should be distinguishable from a data frame for communications using relay communication apparatuses in order to reduce traffic.

Afterward, when the sending end communication apparatus knows, for example, by detecting a state in which no response has been returned thereto even after a predetermined time period, that the direct communication is impossible, the sending end communication apparatus searches for relay communication apparatuses through which a user data frame should pass before it reaches the destination communication apparatus, stores into the user data frame information on the addresses of the searched relay communication apparatuses and the order in which the user data frame passes through the relay communication apparatuses, and transmits this user data frame. Each relay communication apparatus transmits the user data frame to the destination apparatuses in accordance with the addresses of the relay communication apparatuses and the specified passing order thereof, recorded in the user data frame.

As a method of searching for a station for relaying a frame, the sending end communication apparatus broadcasts a search frame to other communication apparatuses within its zone. Each communication apparatus, when receiving the search frame, examines whether the communication apparatus itself is being searched. If so, the communication apparatus returns information on the relay communication apparatus to the sending end. If not, the communication apparatus records its address in the search frame next to the last recorded relay apparatus address, and broadcasts the search frame only once within its zone. Each communication apparatus repeats this processing in a chain manner to search for relay communication apparatuses over the entire communicable range of the radio data communication system. The broadcasting of the search frame from each communication apparatus is desirably limited to only once in order to prevent the search frame from infinitely circulating from one communication apparatus to another to increase traffic. Further, for broadcasting the search frame, some techniques are necessary so as to enable all communication apparatuses within the zone to receive the search frame in one broadcasting operation. For example, the search frame may be broadcast while any other communication apparatus is not communicating in each zone.

The above method is used when a necessary communication cannot be directly achieved from a sending end to a destination. Alternatively, as a second embodiment, topology information (information on the configuration of relay communication apparatuses which are passed through by a data frame before it reaches a destination communication apparatus) within a communicable range, required for the relay communications, may be previously exchanged among associated communication apparatuses, such that a transmitted frame is sent by way of specified relay communication apparatuses, based on the topology information, to the destination. Also, for this method, the sequentially chained broadcasting may be used to distribute the topology information to associated communication apparatuses within the zone periodically or when a change in the configuration is detected.

In this way, since route information indicating relay communication apparatuses to a destination can be acquired without intervention of dedicated relay apparatuses, base station, or the like, the communicable range can be economically and conveniently extended.

Further, as a third embodiment in addition to the above two methods, it is also possible to transmit data without previously examining the possibility of data arrival to the destination or the addresses of relaying communication apparatuses. This is a method which simultaneously executes data transmission and route search. More specifically, a sending end communication apparatus broadcasts a user data frame to respective communication apparatuses located in its zone. Each of the communication apparatuses which have received the user data frame broadcasts the received frame only once within its own zone when the communication apparatus itself is not the destination of the frame. By repeating this in-zone broadcasting in a chain manner, the user data frame from the sending end communication apparatus can be distributed to all communication apparatuses over the entire communicable range.

When this third method is used, the user data frame must be provided with information on a destination communication apparatus (address) in addition to a broadcast address. Each communication apparatus receiving the frame determines, from the information on a destination communication apparatus, whether the frame is destined to the communication apparatus itself. If so, the communication apparatus receives the user data contained in the frame as a destination apparatus. Otherwise, the communication apparatus broadcasts the user data frame in order to forward it to the destination communication apparatus.

In this way, since data can be forwarded to the destination communication apparatus by broadcasting a user data frame once per zone, the communicable range can be extended in a reduced communication time as compared with the above-mentioned two prior art methods.

Thus, according to the present invention, since the communicable range can be extended without additionally installing wired LAN, the system is free from spoiled appearance and additional cost due to the construction of wired LAN, and a variety of restrictions imposed to the wired LAN. Also, the communicable range can be freely modified in a short time period by moving the locations of relay communication apparatuses.

Also, by radio communication with a destination communication apparatus through a wide area radio communication network, the communicable range can be extended without wired connection to each communication apparatus, although the public network fee is charged, as compared with the conventional radio LAN system which is only limited to communications within an area in which radio waves are directly received.

BRIEF DESCRIPTION OF THE DRAWINGS

FIGS. 7–10 are diagrams conceptually illustrating the structures of data frames and search frames, respectively, for use in the radio data communications according to the present invention;

DESCRIPTION OF THE PREFERRED EMBODIMENTS

Embodiments of the present invention will hereinafter be described in detail with reference to the accompanying drawings.

Figure 1:
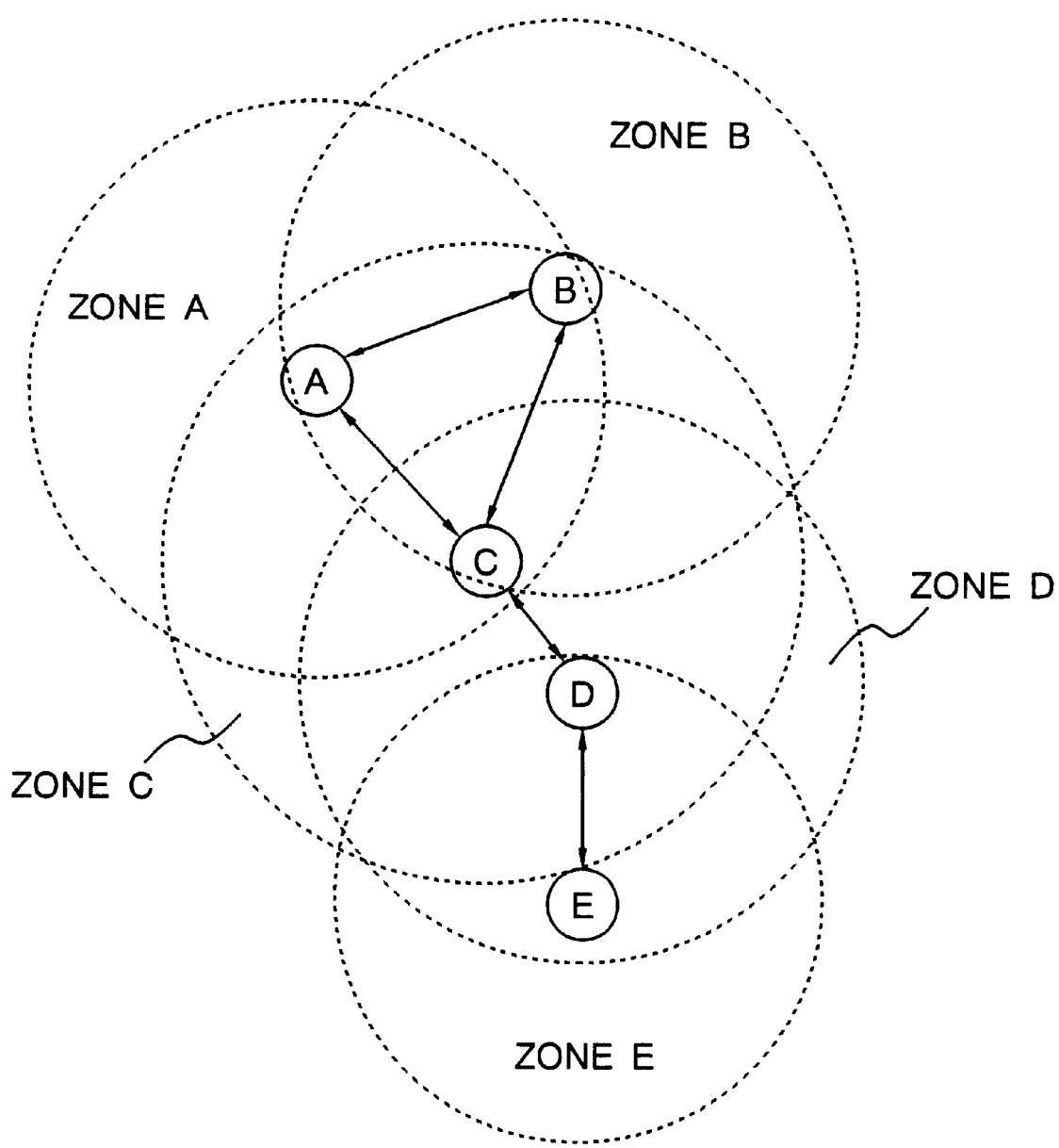
FIG. 1 is a diagram conceptually illustrating an exemplary configuration of a radio data communication system according to an embodiment of the present invention.

FIG. 1 conceptually illustrates examples of possible communication routes among a plurality of radio data communication apparatuses composing a radio data communication system according to an embodiment of the present invention for explaining the concept of the system. Denoted by A–E are radio data communication apparatuses in this embodiment. It should be particularly noted that these communication apparatuses are each provided not only with a transmission/reception function but also with a relay function, and may serve as a fixed station or as a mobile station as the case may be.

Referring to FIG. 1, a range in which radio waves from each radio data communication apparatus can reach without degradation is called a zone, and zones for the respective communication apparatuses A–E are designated zone A–zone E, respectively. Here, a procedure of radio data communications will be described, when performed from the communication apparatus A as a sending end to the communication apparatus E as a destination, on the assumption that the respective radio data communication apparatuses are in an available state for communication. It should be noted however that the description to be made below will be limited to an outline of the procedure, assuming that the communication A is already aware of information on routes to the communication apparatus E. Details of a route information acquiring method and a data communication method will be described later.

First, the communication apparatus A transmits a frame to the communication apparatus C located in the zone A. The communication apparatus C, when knowing from information in the frame that the frame is addressed to the communication apparatus E, transmits the frame to the communication apparatus D which serves as a next relay station required for the frame to reach the communication apparatus E. The communication apparatus D, when knowing in a similar manner that the received frame is addressed to the communication apparatus E, directly transmits the frame to the communication apparatus E. In this way, any communication apparatus can communicate with a station located in a wider area beyond its own zone. The zone is not always limited to a circular shape and may take a rather complicated shape in an electrostatically shielded place such as a room in a building. In this case, the radio data communication method according to the present invention enables communications between rooms by installing a station or communication apparatus near the entrance of each room.

In the prior art, the radio data communication system as described above is generally designed to be effective only within a local radio communication network of a specific building or the like, so that communications cannot be made with a station located outside of the local radio communication network.

Figure 2:
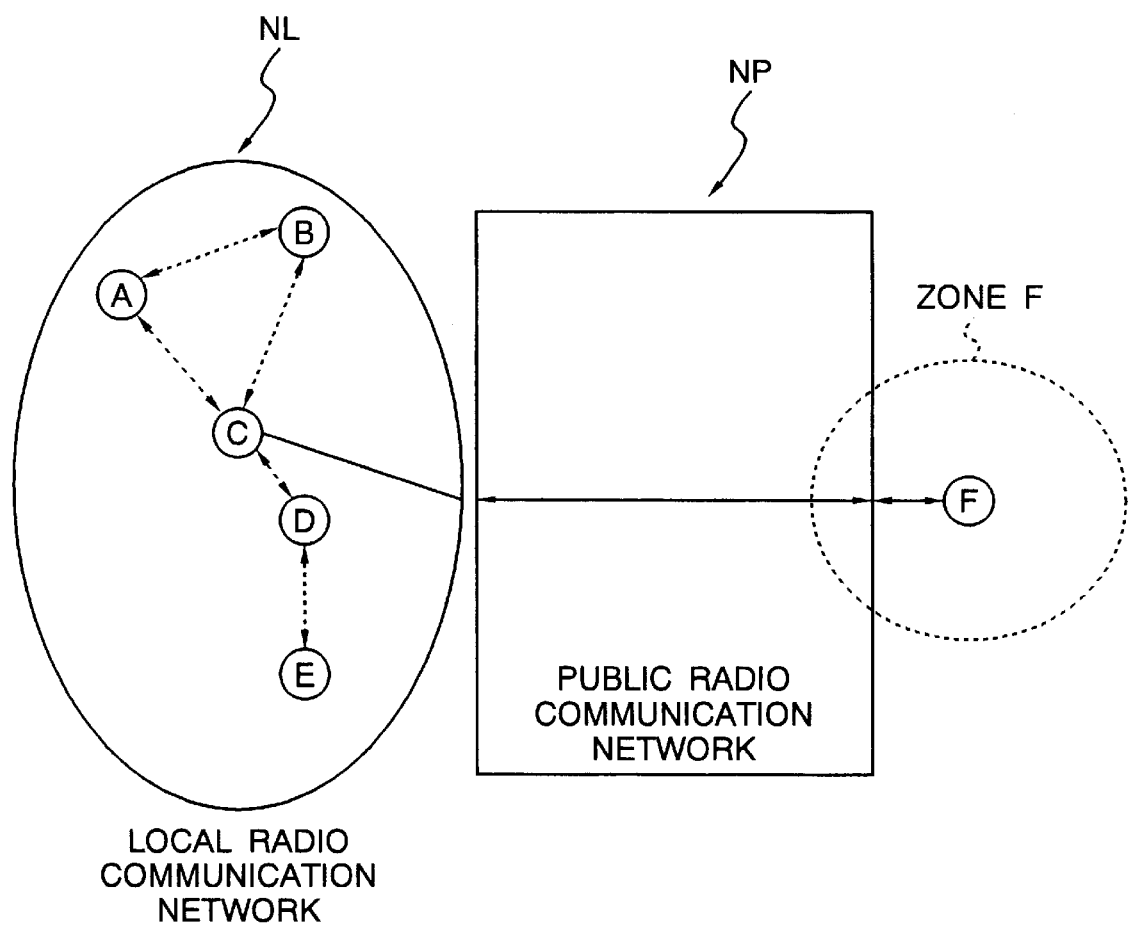
FIG. 2 is a diagram conceptually illustrating an exemplary configuration when Two radio data systems communicate each other through a wide area radio data communication network in the radio data communication system according to the embodiment of the present invention.

FIG. 2 illustrates as an example how a communication apparatus outside of a local radio communication network NL communicates with a destination communication apparatus through a wide area radio communication network. If a communication apparatus F were located within the local radio communication network, it would function as a radio LAN terminal in the network NL to perform the radio data communications according to the present invention. However, since the communication apparatus F is located outside of the local radio communication network NL, radio waves transmitted therefrom will not reach the radio communication network in the area. In this event, the communication apparatus F connects to the local radio communication network NL (Radio LAN) through a public radio communication network NP for communications with a destination communication apparatus. A communication method used in the local radio communication network NL has been described above. The switching from a search for a destination communication apparatus within the local radio communication network NL to a communication through the public radio communication network NP may be automatically carried out when the destination communication apparatus cannot be found or when no response is returned from any communication apparatus located within the local radio communication network NL. There is of course a case where the local radio communication network NL need not be accessed, always by way of the public radio communication network NP, in order to avoid charges on the public radio communication network. Therefore, the communication apparatus should be provided with a means to disable the automatic switching by a mode selection or the like.

Next, a method of tracing a route to a destination communication apparatus and a method of relaying and transferring data, according to the present invention, will be described, by way of examples, in connection with the following three embodiments.

The first one is a sending end specifying relay, where the addresses of a relay communication apparatuses are searched as required by a method called a "relay station search method", and the address of the relay communication apparatuses obtained as a result of the search is used to relay data.

The second one is a sending end specifying relay, where route information for each destination communication apparatus (the addresses of a passed-through relay communication apparatuses) is previously distributed to all communication apparatuses located within a communicable range (this is called a "network topology (NT) search method), and data is transmitted based on the route information.

The third one is a relay-specified method which searches for a destination communication apparatus together with transmitted data without previously examining information on a route to the destination communication apparatus.

Figure 3:
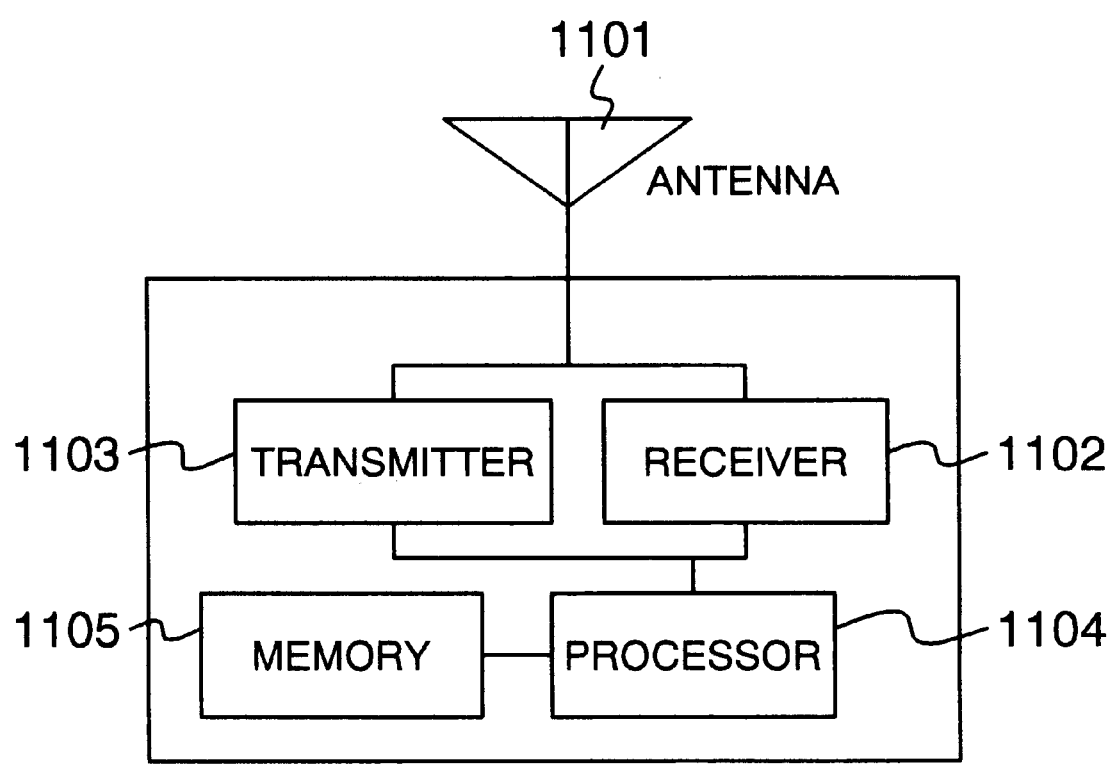
FIG. 3 is a block diagram illustrating an exemplary configuration of a radio data communication apparatus according to an embodiment of the present invention.

FIG. 3 is a block diagram illustrating an exemplary configuration of a radio data communication apparatus for use in the radio data communication system according to this embodiment. The illustrated radio data communication apparatus constitutes each of the plurality of communication apparatuses A–E. As an example, the apparatus is composed of a transmitter 1103 for transmitting frames; a receiver 1102 for receiving frames; an antenna 1101 for transmitting frames therethrough as radio waves; a processor 1104 for performing a sequence of processing mentioned above on frames to be transmitted or on received frames; and a memory 1105 for storing frames, route information, frame identification information, processing programs, and so on.

The processor 1104 may be implemented by a central processing unit such as that used in an ordinary information processing system which may execute necessary control procedures in the form of programs, or a specifically programmed logic device or the like.

Figure 4:
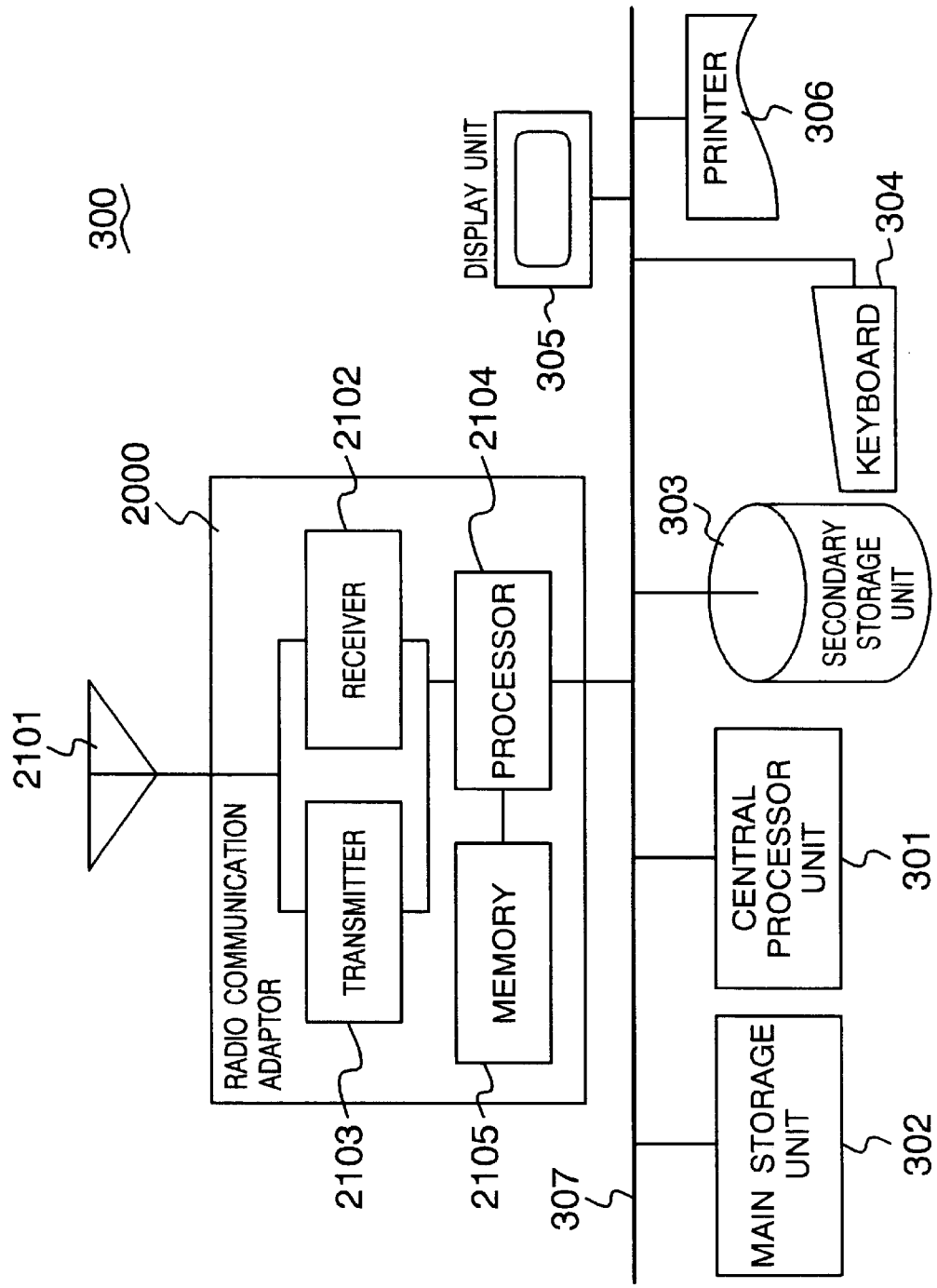
FIG. 4 is a block diagram illustrating an exemplary configuration of a radio data communication apparatus according to another embodiment of the present invention.

FIG. 4 is a block diagram illustrating an exemplary configuration of a radio data communication apparatus according to another embodiment.

In FIG. 4, the configuration illustrated in FIG. 3 is added to a general-purpose information processing unit 300 as a radio communication adaptor 2000 so as to function as the radio data communication apparatus. More specifically, the radio communication adaptor 2000 is composed of a transmitter 2103 for transmitting frames; a receiver 2102 for receiving frames; an antenna 2101 for transmitting therethrough frames as radio waves; a processor 2104 for performing a sequence of processing mentioned above on frames to be transmitted or received frames; and a memory 2105 for storing frames, route information, frame identification information, processing programs, and so on.

The processor 2104 may be implemented by a general-purpose microprocessor or the like, or by a dedicated logic LSI or the like having specific functions programmed therein.

The information processing unit 300 has its components connected to a system bus 307. Specifically, connected to the system bus 307 are a central processing unit 301 comprising a general-purpose microprocessor or the like; a main storage unit 302 comprising semiconductor memories or the like for storing operating programs and data for the central processing unit 301; a secondary storage unit 303 comprising a hard disk drive or the like; a keyboard 304 for the operator to input data, commands, and so on; a display unit 305 for displaying information; a printer 306 for printing information; and so on. The system bus 307 is also connected to the radio communication adaptor 2000.

Thus, a plurality of information processing units 300 as described above are provided to function as the communication apparatuses in the radio data communication network according to this embodiment, thereby constituting an information network which has the plurality of information processing units 300 mutually connected through the radio data communication network and can extend its radio communication area.

Figure 5:
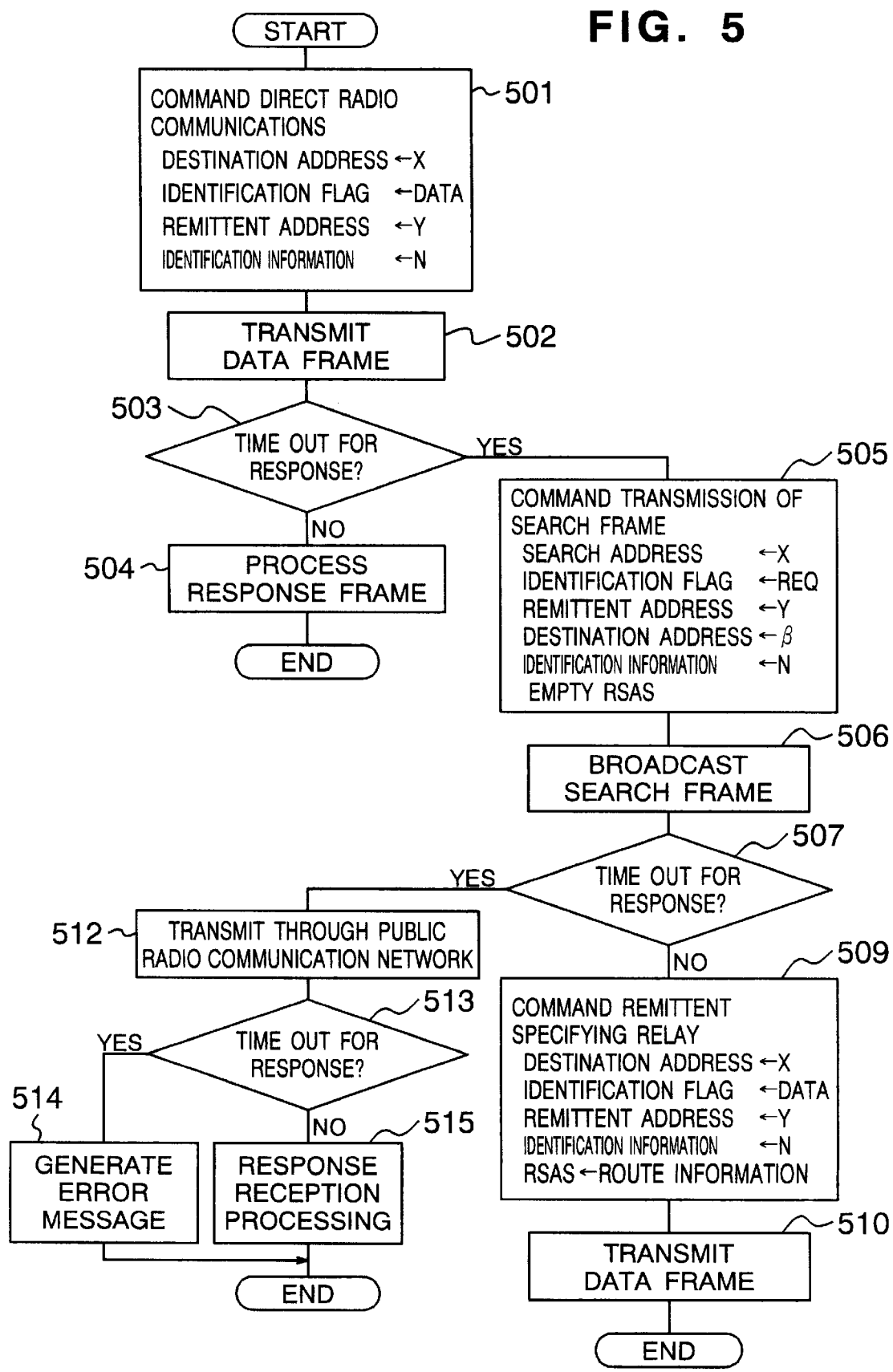
FIG. 5 is a flow chart representing a communication operation procedure for a sending end communication apparatus according to the present invention.
Figure 6:
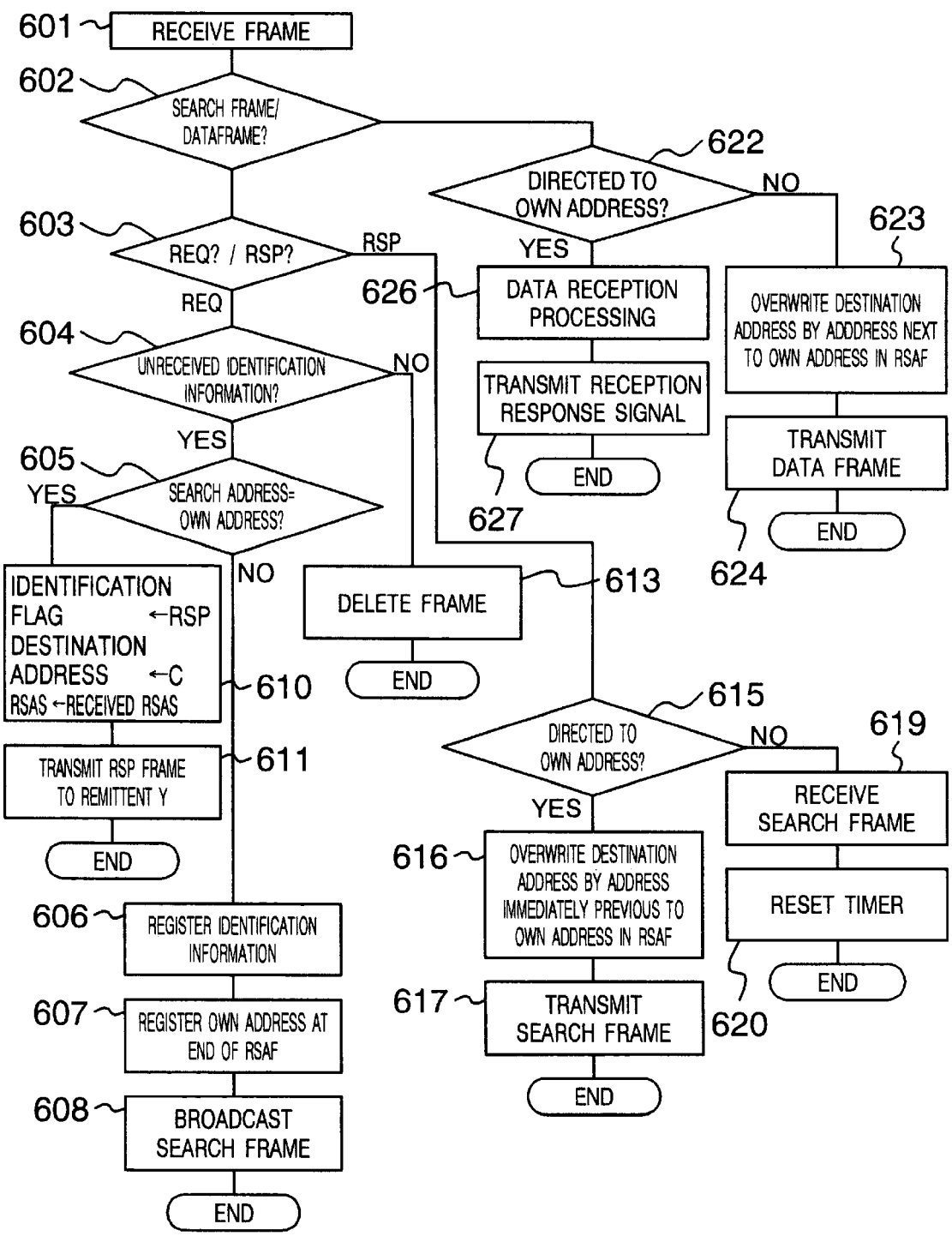
FIG. 6 is a flow chart representing a communication operation procedure for a receiving communication apparatus according to the present invention.

Next, the processing for searching for the address of a relay communication apparatus will be described with reference to FIGS. 5 and 6. This processing is performed by use of the relay station search method prior to data transmission. The processing is executed by the processors 1104, 2104 (FIGS. 3, 4) in the respective communication apparatuses. The operations of these processors are represented by FIGS. 5 and 6, respectively. In the following description, the address of a sending end communication apparatus and a destination communication apparatus are designated "Y" and "X", respectively.

Figure 7:
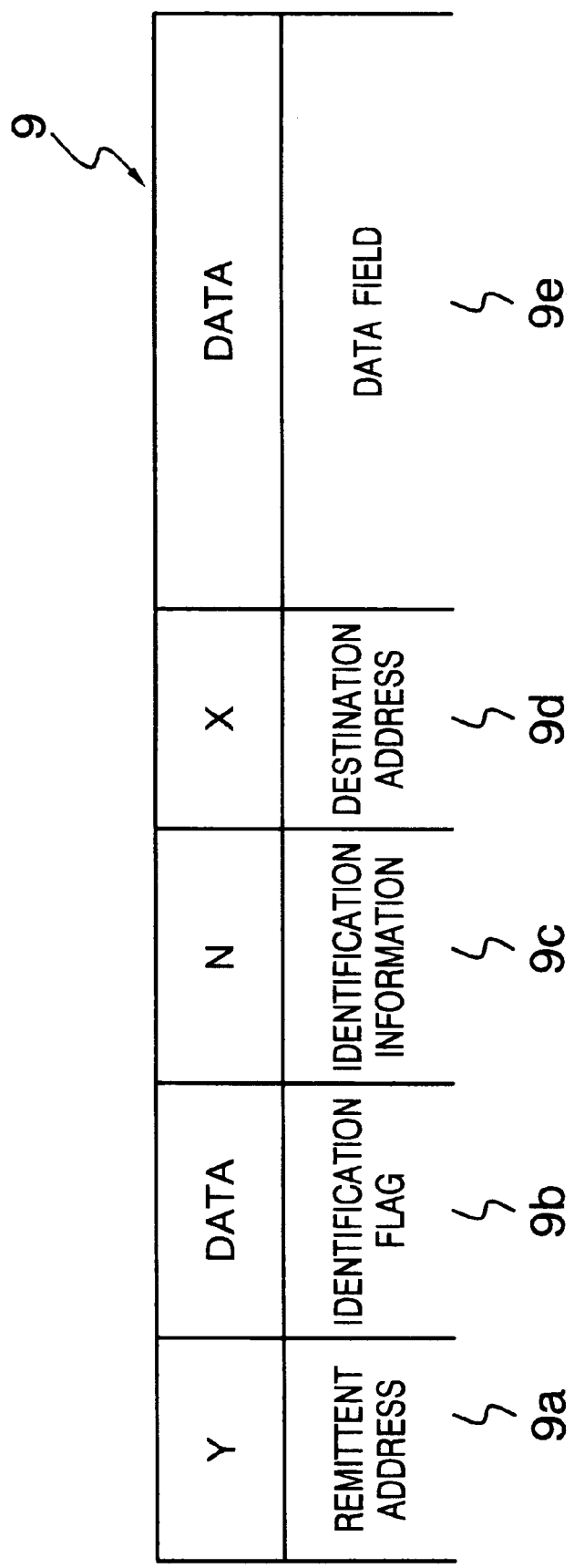

Referring first to FIG. 5, the sending end communication apparatus first attempts direct radio communications within its zone on the assumption that a destination communication apparatus, to which the data is transmitted, is located within its zone. In the trial communications, a data frame 9 as shown in FIG. 7 is used. In the data frame 9, "Y" is registered as a sending end address 9a; "data" indicating that this is a data frame, in an identification flag 9b, as information indicative of the contents of the frame; "N" as identification information 9c having a value unique to each frame for a predetermined time period for distinguishing the frame itself from others in the entire network; "X" as a destination address 9d indicative of the address of the destination communication apparatus; and data to be transmitted in a data field 9e (step 501). Next, the sending end communication apparatus broadcasts the data frame 9 at step 502, and waits for a predetermined time period for a response from the destination communication apparatus acknowledging the reception of the data frame 9.

Then, it is determined at step 503 whether the predetermined time period has elapsed before no response is received. If a response acknowledging the reception is received within the predetermined time period and accordingly NO is determined at step 503, the sending end communication apparatus confirms that the direct radio communication was successful, processes the response frame at step 504, and terminates the processing flow.

On the other hand, if YES is determined at step 503, it means that the direct radio communication failed. Then, at step 505, the sending end communication apparatus commands the transmission of a search frame 10 for searching for the address of a relay communication apparatus which serves as a transmission route to the destination communication apparatus to which data is to be transmitted.

In the search frame 10, as illustrated in FIG. 8, a sending end address 10a is set to "Y"; a search address 10d to "X", which is the address of the destination communication apparatus, for searching for a relay communication apparatus; an identification flag 10c to "REQ" for indicating that this is a search requesting frame; identification information 10e to "N"; and a destination address 10a to a broadcast address β consisting of all bits set to "1" such that all communication apparatuses within the zone can receive this frame. A relay station address field (RSAF) 10f is left empty (step 505).

Next, at step 506, the sending end communication apparatus broadcasts the search frame 10 to all communication apparatuses within the zone. In this event, the sending end initiates the broadcasting while any other communication apparatus is not transmitting within the zone. This transmission timing can be sensed by known carrier sense processing for sensing the existence of a carrier used in the system.

The sending end communication apparatus, after transmitting the search frame 10 at step 506, waits for a predetermined time period for a response search frame to be returned thereto from the destination communication apparatus which has received the search frame.

If the timer expires, the sending end communication apparatus may transmit a new search frame with new identification information N+1. This is because the receiving communication apparatuses might be temporarily off or receiving other frame from other zone for a short time. The retransmission of the search frame make the possibility for finding an appropriate relay or destination communication aparatuses higher.

Described above is a search frame transmission procedure performed by the sending end communication apparatus. Next, the operation of a communication apparatus when receiving the search frame will be described with reference to FIG. 6.

Each communication apparatus located in the zone of the sending end communication apparatus, when receiving the search frame 10 at step 601, determines at step 602 whether the received frame is a search frame or a data frame. Since the search frame is now received, the processing flow proceeds to step 603, where determination is made as to whether the search frame has the identification flag 10c set to "REQ" indicative of a search request or to "RSP" indicative of a response search frame which is transmitted after the completion of a search. Since the identification flag 10c is set to "REQ" in this particular example, the processing flow proceeds to step 604, where it is determined based on the identification information in the search frame whether the search frame has been passed through the communication apparatus. Assuming now that the search frame has reached the communication apparatus for the first time, the processing flow proceeds to step 605.

At step 605, the communication apparatus determines whether the search address "X" in the received search frame is equal to its own address. Assuming that the search address "X" is not equal to its own address, the communication apparatus functions as a relay station. In this case, the identification information in the search frame is registered in the memories 1105, 2105 in FIG. 4 for a predetermined time period, and is automatically deleted after the lapse of the predetermined time period. Next, at step 607, the address of the communication apparatus is registered in the first field a in the relay station address field RSAF 10f of the search frame 10. Then, the communication apparatus, functioning as a relay station, broadcasts the search frame at step 608. Incidentally, if the search frame is received by the communication apparatus after it has passed through any other relay station, the communication apparatus registers its address in a field next to the last registered field of the RSAF at step 607. In this way, the search frame is successively relayed by the communication apparatuses within the communicable range.

When YES is determined at step 605, meaning that the communication apparatus receiving the search frame corresponds to the search address in the search frame, i.e., the destination communication apparatus, the communication apparatus converts the received search frame to a response search frame 11, as illustrated in FIG. 9, at step 610. Specifically, the identification flag 10c is changed to "RSP"; and the destination address 10a to the address c of the last relay station. The relay station address field 10f of the search frame 10 is used as it is in the response search frame 11. The response search frame 11 thus converted is transmitted at step 611. The response search frame is returned to the sending end after sequentially tracing back relay stations recorded in the relay station address field.

The determination at step 604 is provided for checking whether or not the identification information registered at step 606 has been stored in the memory. If NO is determined at step 604, it means that the search frame has already been received by any other communication apparatus. In other words, such search frame has reached the current communication apparatus after passing through other communication apparatuses with a delay. This search frame is deleted at step 613. This is because a search frame which reaches the communication apparatus for the first time is regarded as optimal.

Consider now that a received frame is determined to be a response search frame at step 603. Since the response search frame is being returned to the sending end communication apparatus with a relay route registered therein after the search for a relay station has been completed at step 611, a communication apparatus receiving the response search frame first determines at step 615 whether the sending end address 10b in the response search frame is equal to its address. If NO is determined at step 615, the destination address 10a in the response search frame is overwritten by the address of a relay station immediately previous to the address of the receiving communication apparatus. The response search frame is then transmitted at step 617.

If it is determined at step 615 that the sending end address 10b in the response search frame is equal to its address, this means that the response search frame has been just returned to the sending end communication apparatus. Therefore, the reception processing is performed on the response search frame at step 619, and a timer is reset at step 620. In response to the timer reset, NO is determined at step 507 in FIG. 5.

As described above, the sending end communication apparatus can acquire the response search frame which holds relay station route information for radio-communicating data to a destination communication apparatus. The sending end communication apparatus utilizes the route information thus acquired to proceed to a step of transmitting data to be directed to a destination.

Figure 10:
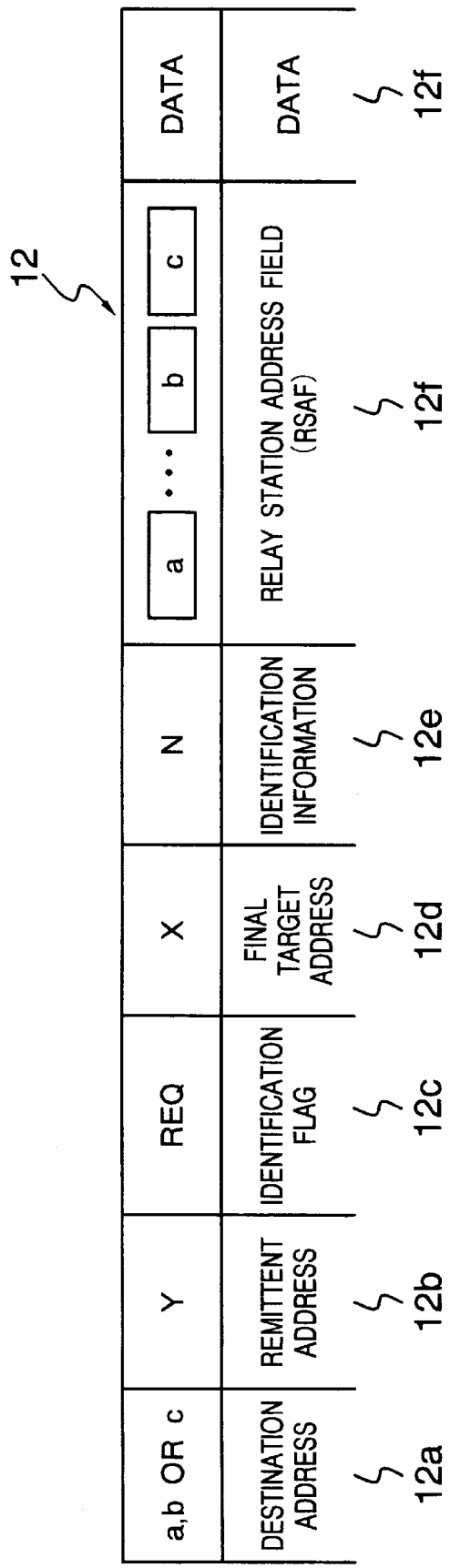

At step 509, a relay transmission specified by the sending end communication apparatus for transmitting data is instructed based on the route information, and a data frame 12 as illustrated in FIG. 10 is created. In this data frame 12, a destination address 12a is set to the first address "a" in a relay station address field 12f; a sending end address 12b to "Y"; a final target address 12d to "X"; an identification flag 12c to "data" indicative of data transmission; an identification information area 12e to "N"; and the relay station address field 12f to the route information. At step 510, this data frame is transmitted with data added in a data area 12g.

A communication apparatus, which has received the transmitted data frame 12, determines at step 602 that the received frame is a data frame with reference to the identification flag 12c in the received data frame 12. Thus, the processing flow proceeds to step 622, where it is determined whether the final target address 12d is equal to the address of the communication apparatus which has received the data frame 12. If not, the destination address 12a is changed to an address stored next to the current address in the relay station address field 12f. Then, at step 624, the data frame 12 thus changed is transmitted. In this way, in accordance with the order of the addresses registered in the relay station address field 12f of the data frame 12, the data frame 12 is successively relayed by communication apparatuses. When the data frame 12 is finally received by the communication apparatus having the final target address "X", YES is determined at step 622, followed by the processing flow proceeding to step 626 for processing the received data. Then, a reception response signal is transmitted at step 627 similarly to the operation at step 611.

If YES is determined at step 507, neither direct radio communication nor relay radio communication is disabled. This situation is thought to occur when the sending end communication apparatus is located outside of the local radio communication network NL as is the case of the communication apparatus F in FIG. 2. In such a case, the processing flow proceeds to step 512, where a search frame is transmitted to the local radio communication network NL through the public radio communication network NP. Then, a response from a communication apparatus within the local radio communication network NL is awaited at step 513.

If a response is returned within a predetermined time period at step 513, the data frame is transmitted in a manner similar to the foregoing. On the other hand, if the predetermined time period has elapsed before no response for the first and retransmitted search frames is returned at step 513, a message is displayed at step 514 to indicate that the communication is impossible.

Figure 11:
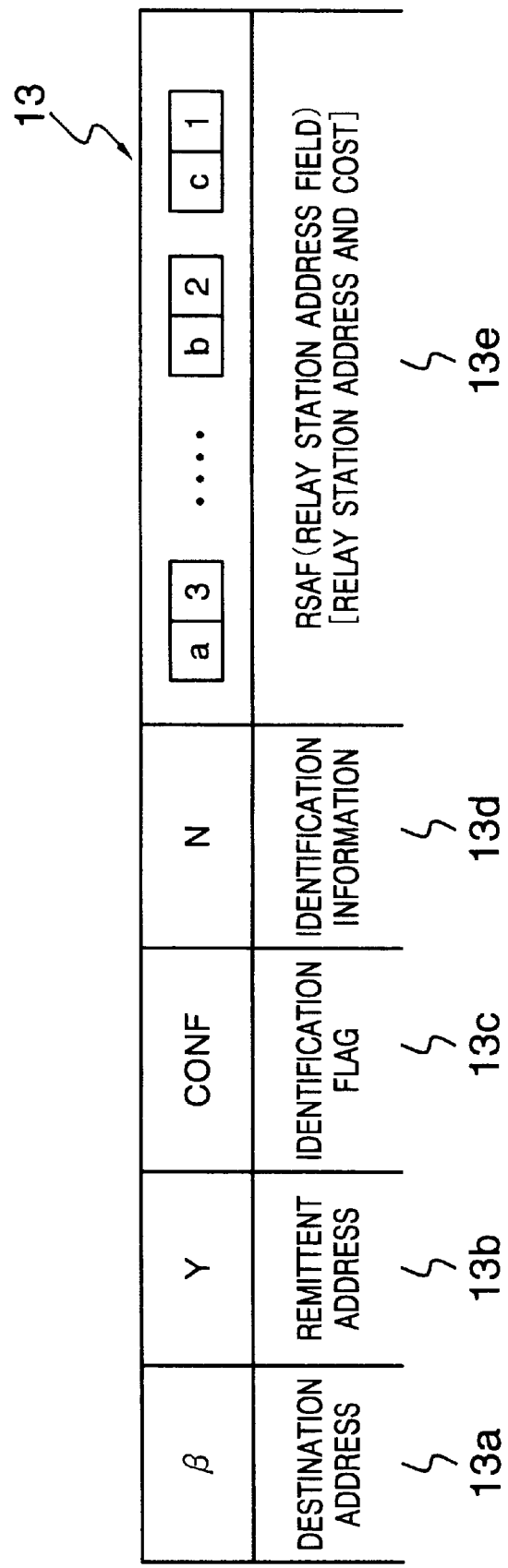
FIGS. 11 and 13 are diagrams conceptually illustrating frame structures for use in another embodiment of the present invention.

Next, the distribution of topology information by a network topology (NT) search method will be described as a second embodiment. FIG. 11 illustrates the structure of an NT search frame 13. This frame has the same format as the relay station search frame 10 illustrated in FIG. 8 except that the relay station address field (RSAF) has a different internal structure. It will be understood that FIG. 11 only illustrates a simplified structure for the purpose of explanation, and the NT search frame may be provided with additional fields for further functions, if required.

Figure 12:
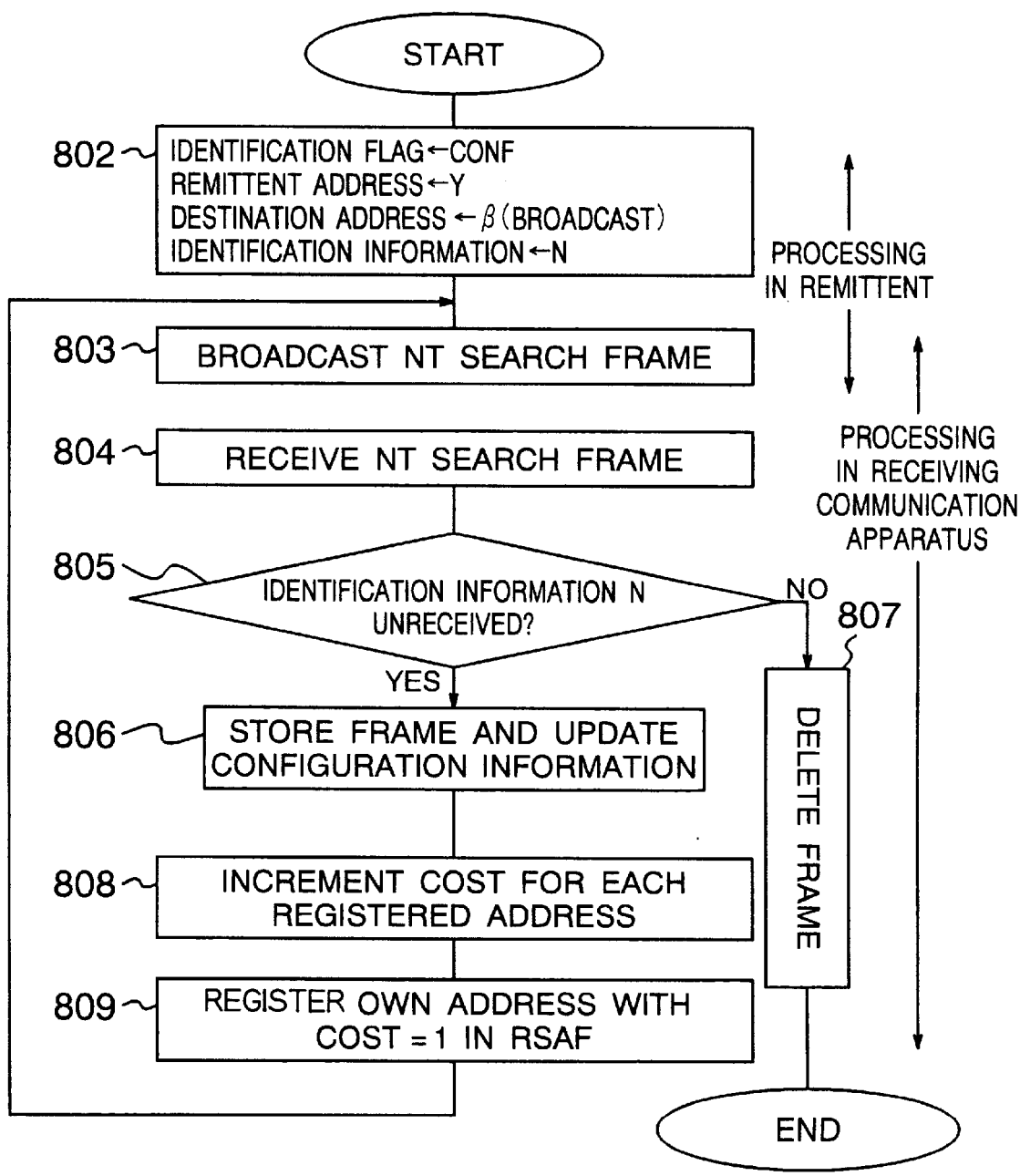
FIG. 12 is a flow chart representing a communication procedure executed utilizing the frame illustrated in FIG. 11.

FIG. 12 is a flow chart representing an algorithm for distributing relay information by use of the NT search frame illustrated in FIG. 11. A method of distributing relay information to respective destinations will be described below with reference to FIGS. 11 and 12.

First, at step 802, a sending end communication apparatus sets a value "Y" to a sending end 13b in the NT search frame 13; a value "Conf" to an identification flag 13c for holding information indicating that this frame is an NT search frame 13; and a value "N" unique to each frame for a predetermined time period to identification information 13d for distinguishing this particular NT search frame 13 from other NT search frames in the entire network. A relay station address field (RSAF) 13e is left empty. Then, the sending end communication apparatus transmits the NT search frame 13 within its zone with a destination address 13a set to a broadcast address (a value β) (step 803). In this event, the sending end communication apparatus broadcasts the NT search frame 13 while any other communication apparatus is not communicating, such that all communication apparatuses in the zone can receive the transmitted NT search frame 13.

The above described is the operation of the sending end communication apparatus for transmitting the NT search frame 13. This operation is performed by all communication apparatuses within the radio communication system, when functioning as a sending end communication apparatus.

Next, the processing of a communication apparatus, when receiving the NT search frame 13, will be described.

Each communication apparatus located within the zone of a sending end communication apparatus receives the NT search frame 13 (step 804), and recognizes that the received frame is an NT search frame 13 from the identification flag 13c thereof set to the value "Conf". Then, the communication apparatus, which has received the NT search frame 13, determines that the frame 13 has not been received by any other communication apparatus if the identification information N in the NT search frame 13 has a value which has not appeared for a predetermined time period in the receiving communication apparatus (step 805). If the identification information N has not been received, the receiving communication apparatus stores relay station addresses and their costs (a number of relays from each station) held in the RSAF 13e of the frame 13 into a memory thereof, and manages them as updated configuration information (step 806). Although this description does not include details of how optimal route information is created from the contents of the RSAF 13e, it is possible to explain, in accordance with a distance vector algorithm called "Distance Vector Algorithm", that an optimal route for each destination is generally derived from the contents in the RSAF 13e.

The communication apparatus which has received the NT search frame 13 adds one to the respective costs for the relay station addresses registered in the RSAF 13e of the received NT search frame 13 (step 808), because the receiving communication apparatus itself is additionally registered in the RSFA 13e as a relay station and accordingly the number of relays is incremented by one. Next, the receiving communication apparatus registers its address and a cost value thereof "1" in the RSAF 13e next to the last registered information (step 809), and then broadcasts the NT search frame 13 within its zone (step 803).

At step 805, if the identification information N in the received NT search frame 13 has been received within a predetermined time period, the received NT search frame 13 is regarded as a multi-relay frame and discarded, determining that the NT search frame 13 involves a time-consuming forwarding route (step 807).

Thus, according to the system of this embodiment, each receiving communication apparatus stores the identification information 13d of received NT search frames classified according to the type of frame, sending end, and destination. If the same frame is received twice, the later one is discarded.

When the above steps are repeated by each of all the communication apparatuses functioning in turn as a sending end, route information to all possible destination communication apparatus can be distributed to all communication apparatus remaining in a available state for communication within the communicable range. Since this distribution of route information involves the broadcasting once for each zone, it causes a significant increase in traffic. Therefore, some techniques may be required to avoid this inconvenience. For example, the NT search frame 13 may be transmitted at relatively long intervals or at the time the configuration is modified (addition of a new station, power on/off of a station, and so on).

Figure 13:
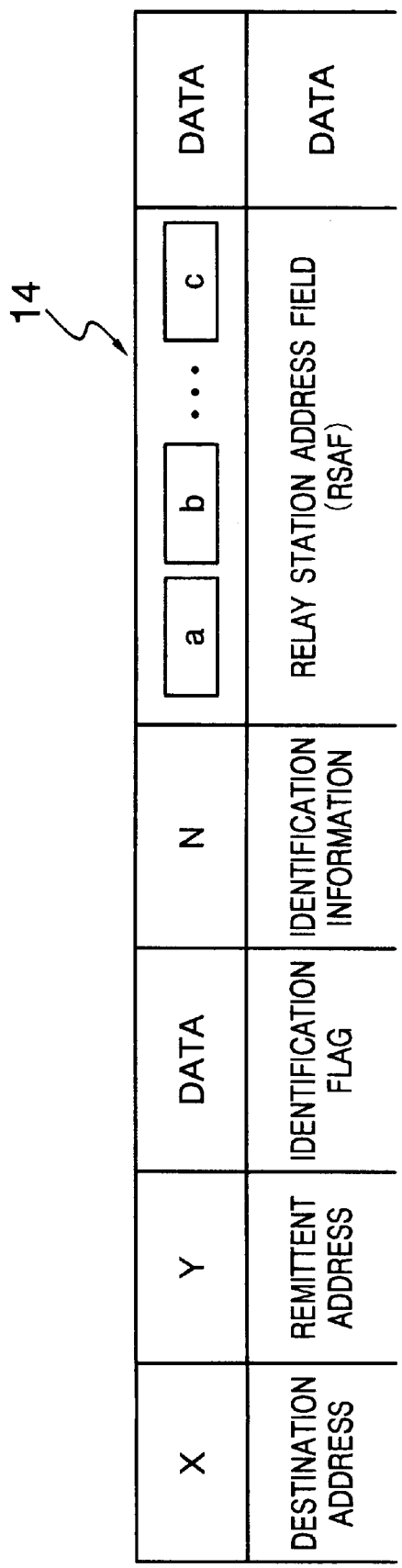

Next, when data is transmitted, a data frame 14 illustrated in FIG. 13 is used. This data frame 14 is identical to the data frame 12 illustrated in FIG. 10. Additionally, the same relay method is employed. Since the transmission method for the data frame 14 is the same as that for the data frame 12 described above with reference to FIGS. 5 and 6, its detailed explanation is omitted.

Figure 14:
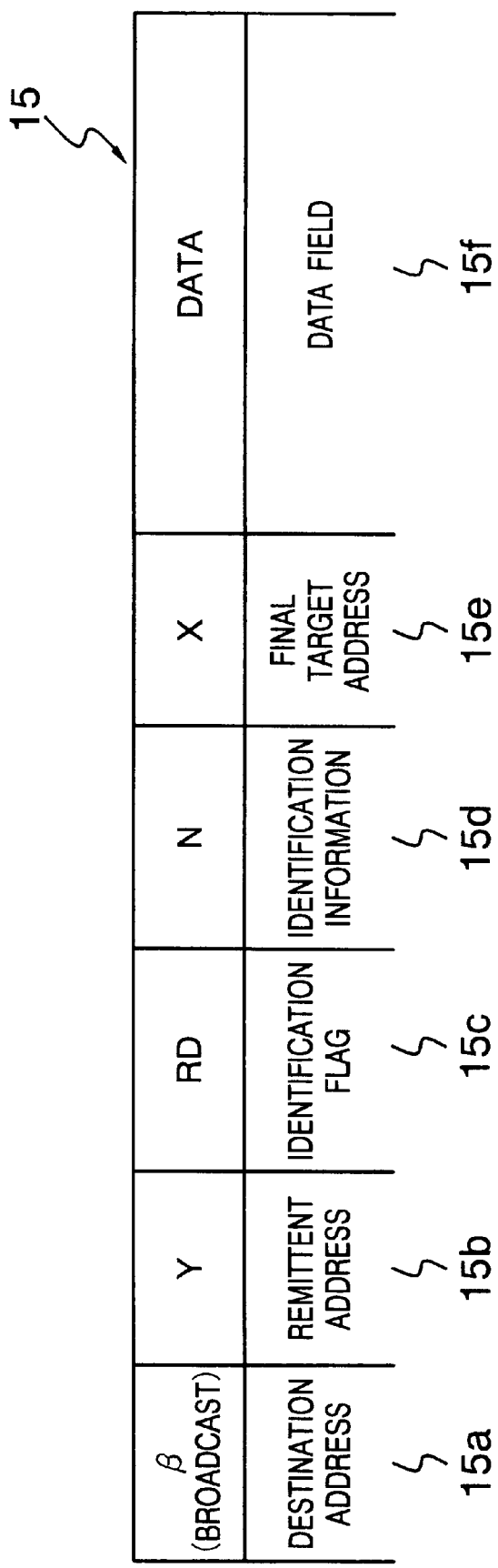
FIG. 14 is a diagram conceptually illustrating a frame structure for use in a communication system according to a further embodiment of the present invention.
Figure 15:
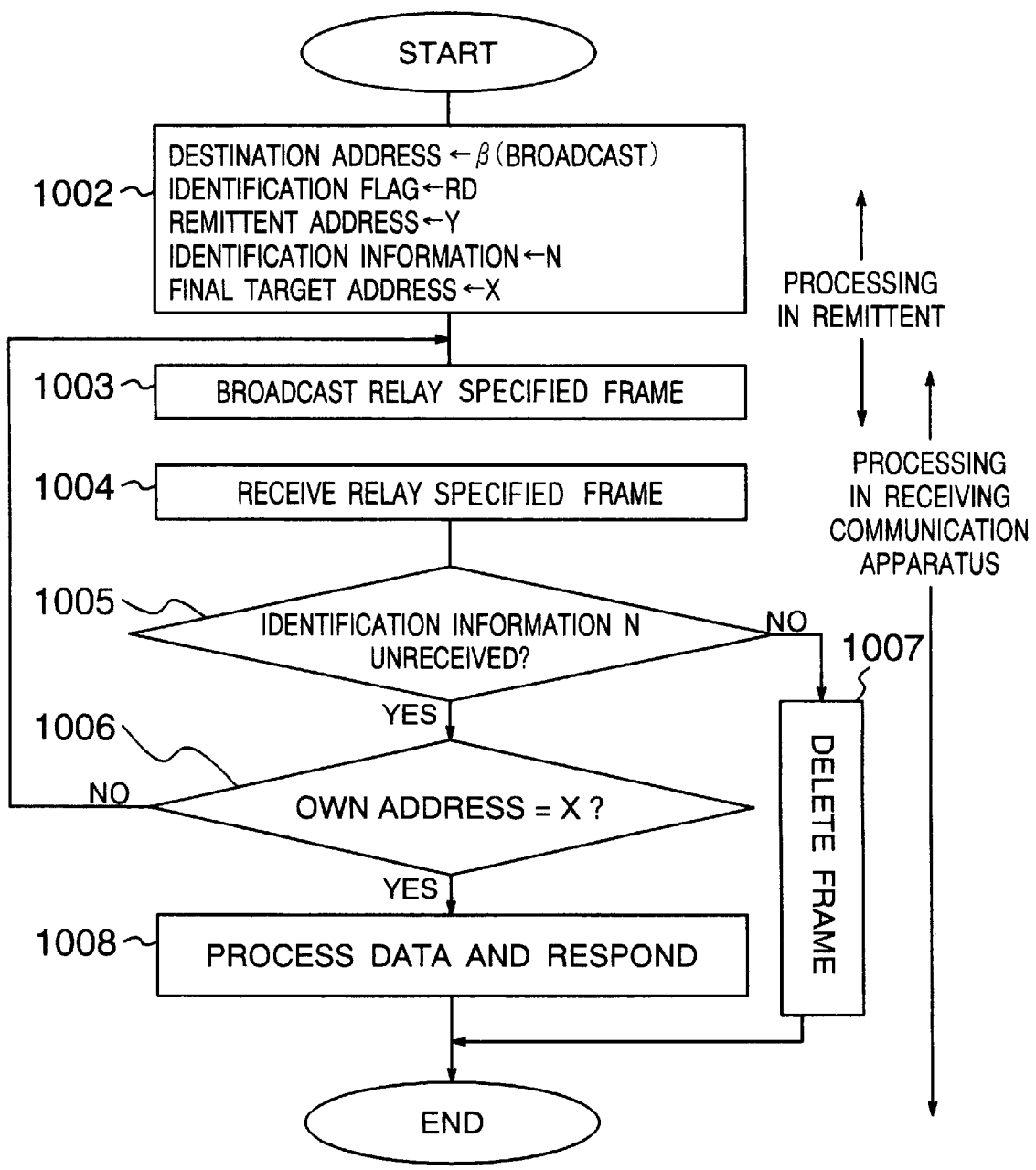
FIG. 15 is a flow chart representing a communication procedure executed utilizing the frame illustrated in FIG. 14.

FIG. 14 illustrates a frame for carrying user data based on the relay-specified method, and this frame is called a "relay-specified frame". FIG. 15 is a flow chart representing an algorithm for transmitting the frame of FIG. 14 to a destination communication apparatus.

A frame transmitting method using the relay-specified method according to a third embodiment will be described below with reference to FIGS. 14 and 15. In this embodiment, a frame containing data is transmitted from the beginning without relying on the search frame.

First, a sending end communication apparatus attempts direct communications with a destination within its zone. If the direct communications are not successful, i.e., if no response for first and retransmitted frame is returned thereto for more than a predetermined time period, the sending end communication apparatus again attempts relay and transmission of data by the following steps, supposing that the destination communication apparatus is located outside of its zone. These steps are similar to steps 501–504 in FIG. 5.

Referring specifically to FIG. 15, the sending end communication apparatus sets, at step 1002, β (broadcast) to a destination address 15a in the relay-specified frame 15; "Y" to a sending end address 15b; a value "RD" indicating that this frame is a relay-specified frame 15 to an identification flag 15c; a value "N" including information for uniquely distinguishing this frame from other frames in a predetermined time period to an identification information 15d; an address "X" of a destination station to a last target address 15e; and user data "Data" to a data field 15f. The relay-specified frame 15 carrying these data is broadcast at step 1003.

The above described is the operation performed by the sending end communication apparatus. Next, the processing performed by a communication apparatus, which has received the relay-specified frame 15, will be described.

Each communication apparatus, which has received the relay-specified frame 15 at step 1004, recognizes "RD" set to the identification flag 15c and hence determines that the received frame is a relay-specified frame 15. Further, if the identification information N in the frame 15 has a value different from those of the identification information in frames which have been received from the same sending end within a predetermined time period (step 1005), the communication apparatus examines whether the last target address 15e (=X) in the first received frame is coincident with its address (step 1006). If they are not coincident, the received relay-specified frame 15 is broadcast at step 1003. On the contrary, if the last target address 15e is coincident with its address (=X), the communication apparatus takes user data from the data field 15f, processes the user data, and returns the processed result to the sending end if necessary (step 1008). While a destination communication apparatus may receive a broadcast relay-specified frame and a copied relay-specified frame which have the same contents through different routes, the destination communication apparatus checks the identification information N in the received frames to select the one which has reached earlier and to discard the other one which has reached later (step 1007).

In this way, the destination communication apparatus and each relay communication apparatus may receive a frame holding the identification information N identical to that in a relay-specified frame 15 transmitted from the same sending end within a predetermined time period. The received frame is the relay-specified frame 15 which has been originated from the same sending end and already received thereby. Such a frame is highly possibly forwarded to the destination by way of a longer route, requires longer time to reach the destination, and is repetitively transmitted. Therefore, this frame should be discarded. Each receiving communication apparatus stores the identification information 15d of received relay-specified frames classified according to the type of frame, sending end, and destination, so as to discard repetitively transmitted relay-specified frames 15, if detected.

As described above, according to the radio data communication method and apparatus, and the radio data communication system, a communicable range can be conveniently extended for the radio data communication system (i.e. radio LAN) without installing wired LAN which involves a variety of restrictions.

It is therefore possible to cut costs required to install the wired LAN and maintain good appearance which would otherwise be damaged by the installation of the wired LAN. Also, the extension of the communication area can be realized in a short time period without requiring excessive labor.

I claim:

1. In a radio data communication network for communicating data through frames carried by radio waves, including a plurality of radio data communication apparatus, each having a relay function, located within said radio data communication network, at least part of said radio data communication apparatuses comprising:

transmitter means for transmitting a frame to be carried by a radio wave to at least one other radio data communication apparatus, said frame having a destination address of a radio data communication apparatus which is specified to be a destination;

receiver means for receiving a frame transmitted from any other radio data communication apparatus;

first determination means for determining whether a frame received by said receiver means has an address directed to the radio data communication apparatus which has received the frame;

reception processing means for processing the received frame for reception when said first determination means determines that the received frame has the address directed to the radio data communication apparatus which has received the frame;

relay means for transmitting the received frame to at least one other radio data communication apparatus by a radio wave when said first determination means determines that the received frame does not have the address directed to the radio data communication apparatus which has received the frame;

said transmitter means transmits either one of a search frame for searching for relay route information from a sending end radio data communication apparatus to a destination radio data communication apparatus, said search frame having a relay station address field in which addresses of relay radio data communication apparatuses are registered in order, and a data frame including data to be transmitted;

said receiver means includes third determination means for determining whether said received frame is a search frame or a data frame; and said relay means includes means for registering the address of said radio data communication apparatus in the highest rank unregistered field within said relay station address field and transmitting said search frame when said first determination means determines that the received frame does not have the address directed to the radio data communication apparatus which has received the frame and when said third determination means determines that said received frame is a search frame.

2. In a radio data communication network for communicating data through frames carried by radio waves, including a plurality of radio data communication apparatus, each having a relay function, located within said radio data communication network, at least part of said radio data communication apparatuses comprising:

transmitter means for transmitting a frame to be carried by a radio wave to at least one other radio data communication apparatus, said frame having a destination address of a radio data communication apparatus which is specified to be a destination;

receiver means for receiving a frame transmitted from any other radio data communication apparatus;

first determination means for determining whether a frame received by said receiver means has an address directed to the radio data communication apparatus which has received the frame;

reception processing means for processing the received frame for reception when said first determination means determines that the received frame has the address directed to the radio data communication apparatus which has received the frame;

relay means for transmitting the received frame to at least one other radio data communication apparatus by a radio wave when said first determination means determines that the received frame does not have the address directed to the radio data communication apparatus which has received the frame;

said transmitter means transmits either one of a search frame for searching for relay route information from a sending end radio data communication apparatus to a destination radio data communication apparatus, said search frame having a relay station address field in which addresses of relay radio data communication apparatuses are registered in order, and a data frame including data to be transmitted; and said search frame has an identification flag indicative of the contents of said frame, said identification flag recording a code representative of a search request for a search request frame which is transmitted by a sending end radio data communication apparatus for the purpose of acquiring relay route information, and a code representative of a search response for a search response frame which is returned from a destination radio data communication apparatus to the sending end radio data communication apparatus.

3. A radio data communication apparatus according to claim 2, wherein:

said relay means includes means for recording the code representative of a search response in said identification flag when said first determination means determines that the received frame has the address directed to the radio data communication apparatus which has received the frame and said third termination means determines that the received frame is a search frame.

4. A radio data communication apparatus according to claim 3, wherein:

said search frame includes a destination address field for recording an address of a radio data communication apparatus to which said search frame is to be next transmitted.

5. A radio data communication apparatus according to claim 4, wherein:

said relay means includes means for recording an address stored in the highest rank field of said relay station address field in said destination address when said first determination means determines that the received frame has the address directed to the radio data communication apparatus which has received the frame and when said third determination means determines that the received frame is a search frame.

6. A radio data communication apparatus according to claim 5, wherein:

said search frame has the address of said sending end radio data communication apparatus recorded therein.

7. A radio data communication apparatus according to claim 6, wherein:

said receiver means includes:

fourth determination means for determining whether said received frame is a search request frame or a search response frame based on said identification flag when said third determination means determines that said received frame is a search frame; and fifth determination means for determining, when said fourth determination means determines that said received frame is a search response frame, whether or not a sending end address in said search response frame is equal to its own address.

8. A radio data communication apparatus according to claim 7, wherein:

said receiver means includes means for recording in said destination address an address placed one rank higher than its own address within said relay station address field, when said fifth determination means determines that its own address is not equal to said sending end address.

9. A radio data communication apparatus according to claim 7, wherein:

said transmitter means includes means for transmitting a data frame which contains said relay station address field and data to be transmitted, when said fifth determination means determines that its own address is equal to said sending end address.

10. A radio data communication apparatus according to claim 9, wherein:

said reception processing means includes means for processing a received data frame for reception and for transmitting to a sending end a reception response frame indicating that the data frame has been received, when receiving a data frame directed to the radio data communication apparatus which has received the data frame.

11. In a radio data communication network for communicating data through frames carried by radio waves, including a plurality of radio data communication apparatus, each having a relay function, located within said radio data communication network, at least part of said radio data communication apparatuses comprising:

transmitter means for transmitting a frame to be carried by a radio wave to at least one other radio data communication apparatus, said frame having a destination address of a radio data communication apparatus which is specified to be a destination;

receiver means for receiving a frame transmitted from any other radio data communication apparatus;

first determination means for determining whether a frame received by said receiver means has an address directed to the radio data communication apparatus which has received the frame;

reception processing means for processing the received frame for reception when said first determination means determines that the received frame has the address directed to the radio data communication apparatus which has received the frame;

relay means for transmitting the received frame to at least one other radio data communication apparatus by a radio wave when said first determination means determines that the received frame does not have the address directed to the radio data communication apparatus which has received the frame;

means for transmitting a data frame containing data to be transmitted and an address of a destination radio data communication apparatus;

first sensing means for sensing reception of a reception response frame indicating that said destination radio data communication apparatus received the transmitted data frame within a predetermined time period after said data frame transmitting means had transmitted the data frame; and means for transmitting a search frame for searching for relay route information from said sending end radio data communication apparatus to said destination radio data communication apparatus when said first sensing means does not sense reception of said reception response frame.

12. A radio data communication apparatus according to claim 11, wherein:

said receiver means includes means for transmitting a search response frame to said sending end radio data communication apparatus when said receiver means receives said search frame and said first determination means determines that the destination address in the received search frame is equal to its own address.

13. A radio data communication apparatus according to claim 12, wherein:

said transmitter means further includes second sensing means for sensing that a search response frame transmitted from a destination radio data communication apparatus has been received within a predetermined time period after said search frame was transmitted.

14. A radio data communication apparatus according to claim 13, wherein:

said transmitter means includes means for transmitting a data frame containing said data to be transmitted, said relay route information, and the address of said destination radio data communication apparatus, when said second sensing means senses reception of said search response frame.

15. A radio data communication apparatus according to claim 13, wherein:

said transmitter means includes means for transmitting said search frame through a public radio communication network when said second sensing means does not sense reception of said search response frame.

16. A radio data communication apparatus according to claim 15, further comprising means for generating an error message when said search response frame cannot be received within a predetermined time period even if said search frame is transmitted through said public radio communication network.

17. In a radio data communication network for communicating data through frames carried by radio waves, including a plurality of radio data communication apparatus, each having a relay function, located within said radio data communication network, said each radio data communication apparatus comprising:

transmitter means for transmitting a search frame for searching for relay route information from a sending end radio data communication apparatus to a destination radio data communication apparatus to at least one other radio data communication apparatus through a radio wave, said search frame containing a sending end address of said sending end radio data communication apparatus, a destination address of said destination radio data communication apparatus, identification information unique to the frame, and a relay station address field for registering addresses of relay radio data communication apparatuses in order;

receiver means for receiving a frame transmitted from another radio data communication apparatus;

first determination means for determining whether a search frame received by said receiver means has an address directed to the radio data communication apparatus which has received the frame;

second determination means for determining whether or not the received search frame has been received by any other radio data communication apparatus based on the identification information in the search frame received by said receiver means;

means for registering the identification information in said radio data communication apparatus when said second determination means determines that the received search frame has not been so far received, and for deleting the received search frame when second determination means determines that the received search frame has already been received;

means for recording its own address into the highest rank field of all empty fields in said relay station address field and transmitting the received search frame, when said first determination means determines that the search frame does not have the address directed to the radio data communication apparatus which has received the search frame;

means for registering relay route information recorded in the relay station address field of the search frame in said radio data communication apparatus and for registering said sending end address in the search frame as the destination address, when said first determination means determines that the search frame has the address directed to the radio data communication apparatus which has received the search frame; and means for transmitting a data frame containing an address of a destination radio data communication apparatus to which data is transmitted, said registered relay route information corresponding to said registered address which is coincident with the address of the destination radio data communication apparatus, and data to be transmitted, to the destination radio data communication apparatus in accordance with said relay route information.

18. In a radio data communication network for communicating data through frames carried by radio waves, including a plurality of radio data communication apparatus, each having a relay function, located within said radio data communication network, said each radio data communication apparatus comprising:

transmitter means for broadcasting a data frame containing data to be transmitted, a sending end address of a sending end radio data communication apparatus, a destination address of a destination radio data communication apparatus, and identification information unique to the frame to at least one other radio data communication apparatus through a radio wave;

receiver means for receiving a frame transmitted from another radio data communication apparatus;

first determination means for determining whether or not a data frame received by said receiver means has an address directed to the radio data communication apparatus which has received the data frame;

second determination means for determining whether or not the data frame received by said receiver means has been received by any other radio data communication apparatus based on the identification information in the data frame;

means for registering the identification information in said radio data communication apparatus when said second determination means determines that the data frame has not been so far received and for deleting the received data frame when said second determination means determines that the data frame has already been received;

means for broadcasting the data frame through a radio wave to other radio data communication apparatuses when said first determination means determines that the data frame does not have the address directed to the radio data communication apparatus which has received the data frame; and means for processing received data when said first determination means determines that the data frame has the address directed to the radio data communication apparatus which has received the data frame.

19. A radio data communication method using a plurality of radio data communication apparatuses having a relay function, located in a radio data communication network for communicating data through frames carried by radio waves, said method comprising the steps of:

transmitting a search frame containing a sending end address of a sending end radio data communication apparatus, a destination address of a destination radio data communication apparatus, identification information unique to the frame, and a relay station address field for registering in order addresses of relay radio data communication apparatuses, said search frame transmitted from a first radio data communication apparatus to at least one other radio data communication apparatus through a radio wave;

receiving a search frame, transmitted from another radio data communication apparatus, by a second radio data communication apparatus, said receiving step including a first determination step for determining whether or not the search frame has an address directed to the radio data communication apparatus which has received the search frame, and a second determination step for determining whether or not the received search frame has been received by any other radio data communication apparatus based on said identification information in the received search frame;

deleting the received search frame when determining at said second determination step that the received search frame has already been received;

registering the identification information in the received search frame in said radio data communication apparatus, and recording its own address into the highest rank field of all empty fields in said relay station address field of the received search frame and transmitting the search frame, when determining at said second determination step that the search frame has not been so far received and when determining at said first determination step that said destination address is not equal to its own address;

setting a search response flag to the received search frame to create a search response frame, and transmitting the search response frame to said sending end radio data communication apparatus through relay radio data communication apparatuses having their relay addresses recorded in said relay station address field, orderly from the one having the lowest rank relay address to others having higher rank relay addresses, when determining at said first determination step that the search frame has the address directed to the radio data communication apparatus which has received the search frame; and transmitting a data frame containing data to be transmitted, said destination address, and relay route information recorded in the relay station address field in the search frame to said destination radio data transmission apparatus in accordance with said relay route information, when said search response frame is received by said sending end radio data communication apparatus.

20. A radio data communication method using a plurality of radio data communication apparatuses having a relay function, located in a radio data communication network for communicating data through frames carried by radio waves, said radio data communication method comprising the steps of:

transmitting a search frame for searching for relay route information from a sending end radio data communication apparatus to each radio data communication apparatus, from a first radio data communication apparatus to at least one other radio data communication apparatus through a radio wave, said search frame containing a sending end address of said sending end radio data communication apparatus, identification information unique to the frame, and a relay station address field for registering in order addresses of relay radio data communication apparatuses;

receiving a search frame transmitted from another radio data communication apparatus, said receiving step including a determination step for determining whether or not the received search frame has been received by any other radio data communication apparatus based on the identification information in the received search frame;

registering the identification information of the received search frame in said radio data communication apparatus when determining at said determination step that the search frame has not been so far received, and deleting the received search frame when determining at said determination step that the search frame has already been received;

recording its own address in the highest rank field of all empty fields in said relay station address field, registering the relay route information recorded in the relay station address field of the received search frame in said radio data communication apparatus, and registering said sending end address in the received search frame as a destination address;

executing said respective steps for all radio data communication apparatuses; and transmitting a data frame containing an address of a destination radio data communication apparatus to which data is to be transmitted, said registered relay route information corresponding to said registered address which is coincident with the address of the destination radio data communication apparatus, and data to be transmitted, to the destination radio data communication apparatus in accordance with said relay route information.

21. A radio data communication method using a plurality of radio data communication apparatuses having a relay function, located in a radio data communication network for communicating data through frames carried by radio waves, said radio data communication method comprising the steps of:

broadcasting a data frame containing data to be transmitted, a sending end address of a sending end radio data communication apparatus, a destination address of a destination radio data communication apparatus, and identification information unique to the frame to at least one other radio data communication apparatus through a radio wave;

receiving a data frame transmitted from another radio data communication apparatus, said receiving step including a first determination step for determining whether or not the received data frame has an address directed to the radio data communication apparatus which has received the data frame, and a second determination step for determining whether or not the received data frame has been received by any other radio data communication apparatus based on the identification information in the received data frame;

registering the identification information of the data frame in said radio data communication apparatus when determining at said second determination step that the data frame has not been so far received, and deleting the received data frame when determining at said second determination step that the data frame has already been received;

broadcasting the data frame through a radio wave to other radio data communication apparatuses when determining at said first determination step that the data frame does not have the address directed to the radio data communication apparatus which has received the data frame; and processing received data when determining at said first determination step that the data frame has the address directed to the radio data communication apparatus which has received the data frame.

22. A radio data communication system using a plurality of radio data communication apparatus having a relay function, located in a radio data communication network for communicating data through frames carried by radio waves, said radio data communication system comprising:

first transmitter means for transmitting a data frame containing data to be transmitted from a sending end radio data communication apparatus to a destination radio data communication apparatus and for waiting for a reception response from the destination radio data communication apparatus for a predetermined time period;

means for transmitting a search frame for searching for relay route information from the sending end radio data communication apparatus to the destination radio data communication apparatus when said first transmitter means fails to detect said reception response within said predetermined time period;

means for recording addresses of radio data communication apparatuses passed by the search frame until the search frame reaches said destination radio data communication apparatus from said sending end radio data communication apparatus;

means for returning a search response frame to said sending end radio data communication frame, when said destination radio data communication apparatus receives the search frame, said search response frame being converted from the search frame; and means for transmitting a data frame containing data to be transmitted and relay route information obtained from the search frame to said destination radio data communication apparatus in accordance with said relay route information, when said search response frame is received by said sending end radio data communication apparatus.

23. A radio data communication system using a plurality of radio data communication apparatus having a relay function, located in a radio data communication network for communicating data through frames carried by radio waves, said radio data communication system comprising:

transmitter means for transmitting a search frame for searching relay route information, said search frame containing a sending end address of a sending end radio data communication apparatus, a destination address of a destination radio data communication apparatus, identification information unique to the frame, and a relay station address field for registering in order addresses of relay radio data communication apparatuses;

receiver means for receiving a search frame transmitted from another radio data communication apparatus, said receiving means including first determination means for determining whether or not the received search frame has been received by any other radio data communication apparatus based on the identification information in the received search frame;

means responsive to said first determination means determining that the received search frame has not been so far received, for registering the identification information of the received search frame in said radio data communication apparatus, registering relay route information recorded in the relay station address field of the search frame in said radio data communication apparatus, registering said sending end address in the search frame as a destination address, and recording its own address in the highest rank field of all empty fields in said relay station address field of the search frame and for transmitting the search frame;

means for deleting the received search frame when said first determination means determines that the received search frame has already been received; and means for transmitting a data frame containing an address of a destination radio data communication apparatus to which data is to be transmitted, said registered relay route information corresponding to said registered address which is coincident with the address of the destination radio data communication apparatus, and data to be transmitted, to the destination radio data communication apparatus in accordance with said relay route information.

24. A radio data communication system using a plurality of radio data communication apparatus having a relay function, located in a radio data communication network for communicating data through frames carried by radio waves, said radio data communication system comprising:

transmitter means for broadcasting a data frame containing data to be transmitted, a sending end address of a sending end radio data communication apparatus, a destination address of a destination radio data communication apparatus, and identification information unique to the frame;

receiver means for receiving a data frame transmitted from another radio data communication apparatus, said receiver means including first determination means for determining whether or not the data frame received by said receiver means has an address directed to the radio data communication apparatus which has received the data frame, and second determination means for determining whether or not the received data frame has been received by any other radio data communication apparatus based on the identification information in the received data frame;

means for registering the identification information in said radio data communication apparatus when said second determination means determines that the received data frame has not been so far received and for deleting the received data frame when said second determination means determines that the data frame has already been received;

means for broadcasting the data frame through a radio wave to other radio data communication apparatuses when said first determination means determines that the data frame does not have the address directed to the radio data communication apparatus which has received the data frame; and means for processing received data when said first determination means determines that the data frame has the address directed to the radio data communication apparatus which has received the data frame.

* * * * *